Feb. 11, 1941.       H. K. HYBARGER       2,231,807
HYDRAULIC TESTING MACHINE
Filed Dec. 30, 1937       3 Sheets-Sheet 1
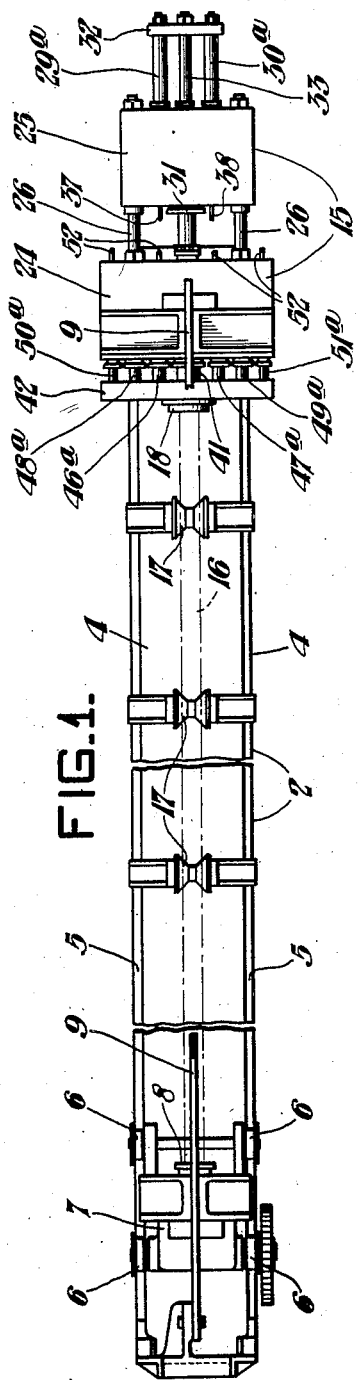
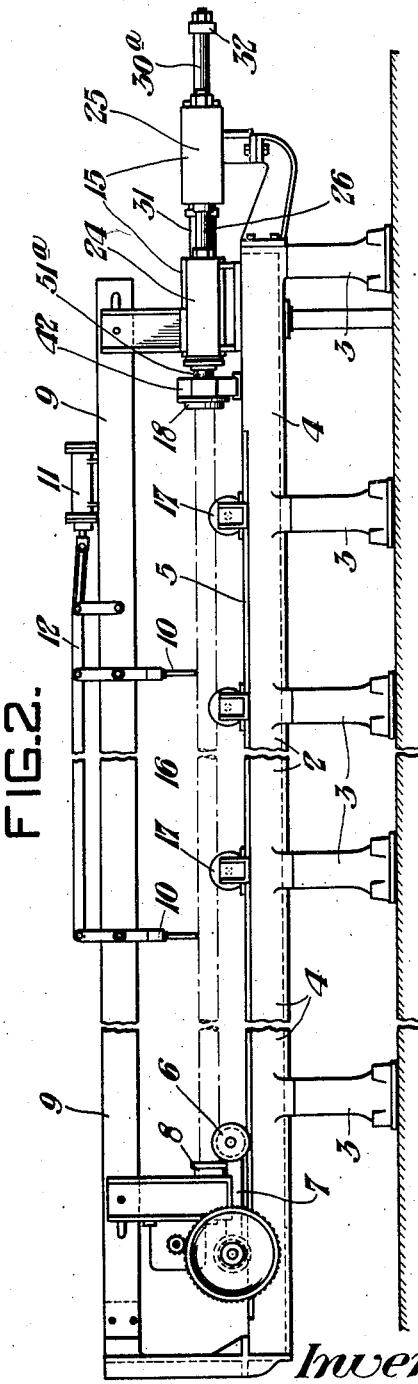
Inventor:
HUGH K. HYBARGER,
by: *Ussria & Lauber*
his Attorneys.

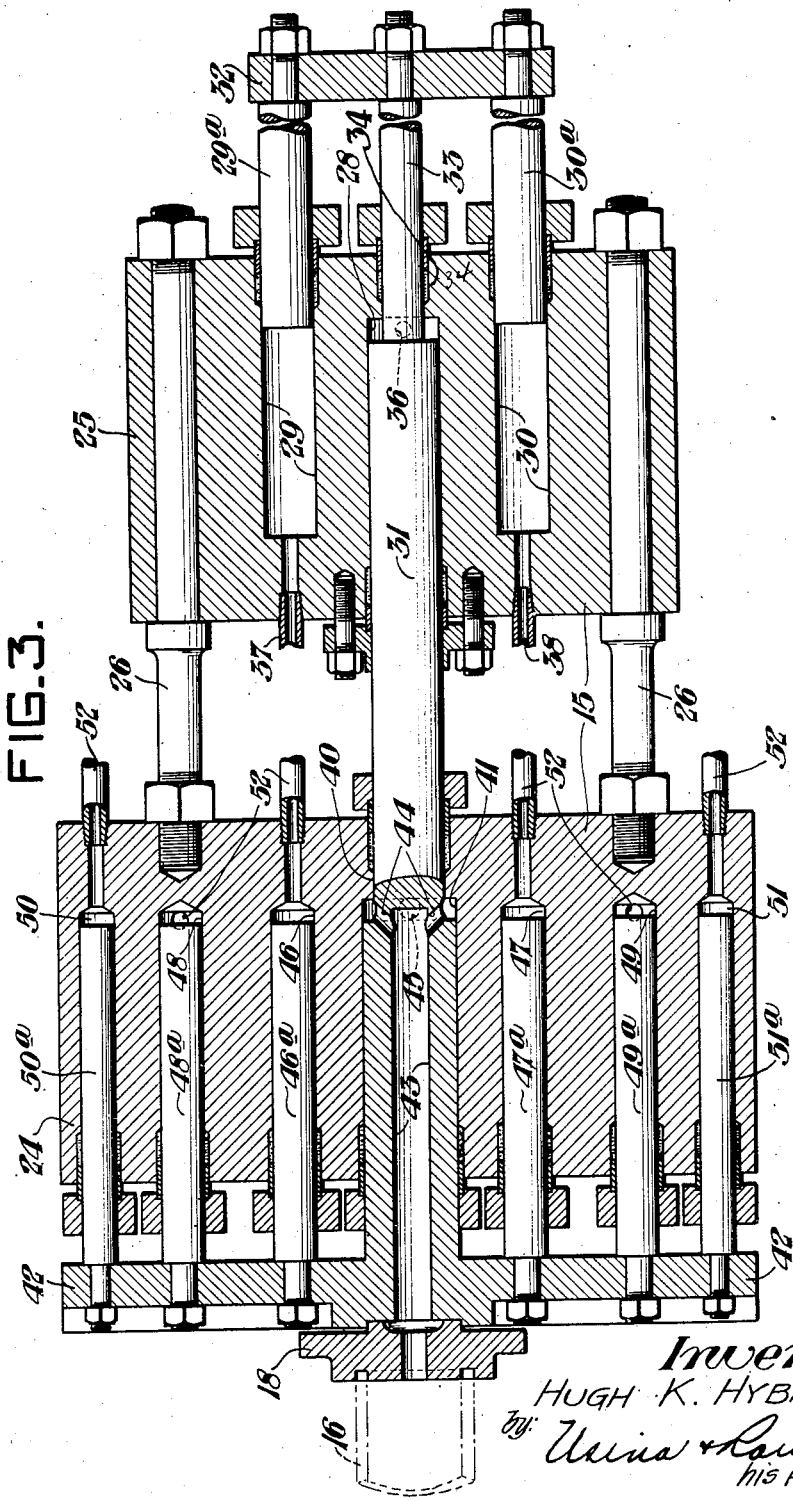

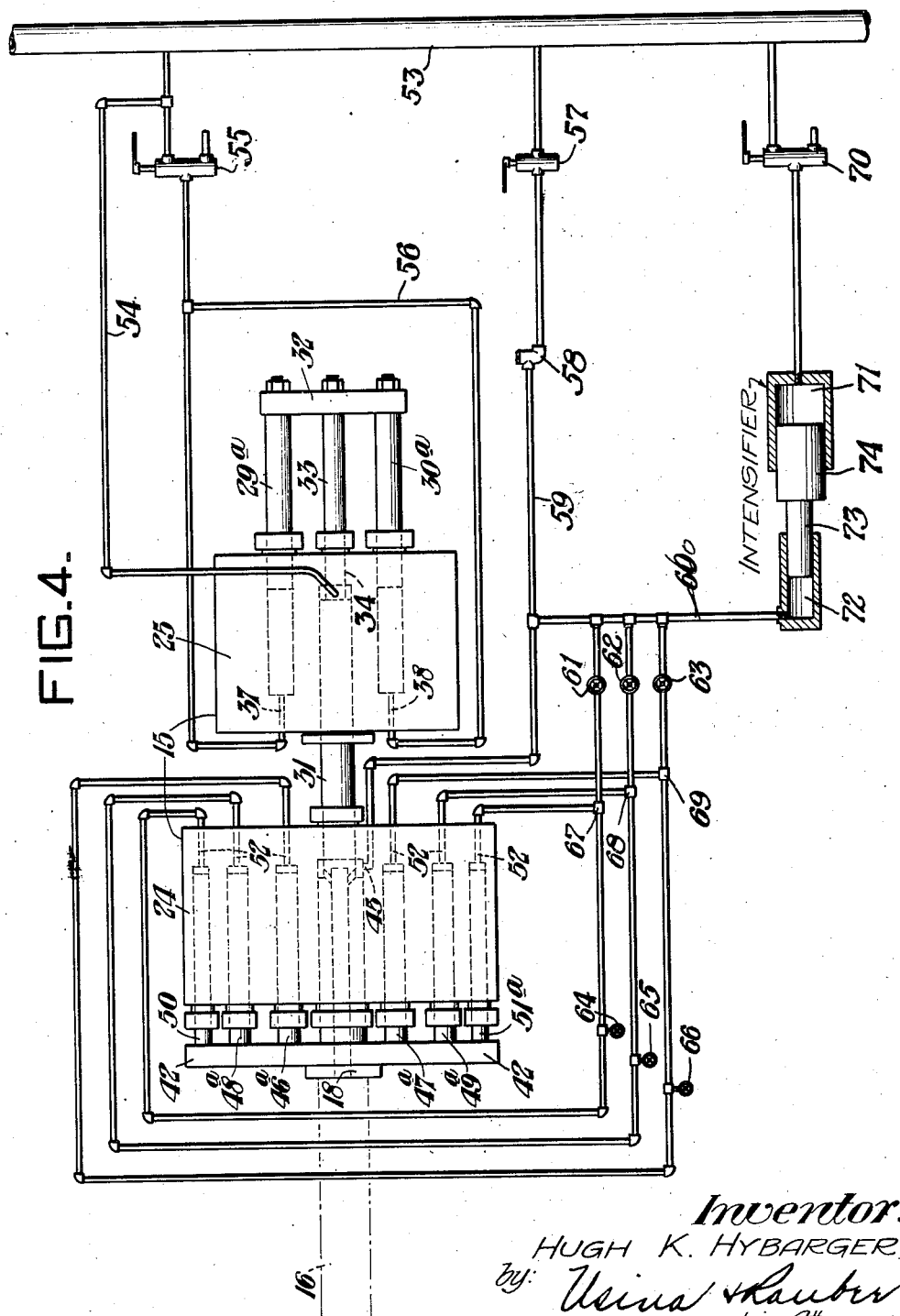

Patented Feb. 11, 1941

2,231,807

UNITED STATES PATENT OFFICE 2,231,807

HYDRAULIC TESTING MACHINE

Hugh K. Hybarger, Elyria, Ohio, assignor to National Tube Company, a corporation of New Jersey Application December 30, 1937, Serial No. 182,616

9 Claims. (Cl. 73—51)

My invention relates to testing and more particularly to the hydraulic testing of hollow objects, such as pipes and tubes.

In testing pipe or tubing by hydraulic pressure it is necessary to exert a pressure on the ends thereof equal to the internal pressure (to be used in testing the pipe) plus an additional pressure to maintain a tight joint at the seals. In conventional testing apparatus this total load, which is developed on the ends of the pipe before the body of the pipe is put under pressure and is maintained briefly after the test pressure is released, has a very harmful effect on the threads of the pipe and coupling, frequently causing failure of the pipe by upsetting the pipe threads or forcing the coupling over the pipe threads, it being understood that threaded pipe is, as a general rule, tested with a coupling placed on one end.

It is, accordingly, an object of the present invention to provide a machine for sealing the ends of pipe for hydraulic testing which will not exert a harmful pressure on the ends thereof.

It is another object of the present invention to provide a machine of the class described which may be easily and cheaply installed and operated.

The foregoing and other objects will be apparent after referring to the drawings in which:

Figure 1 is a top plan of a hydraulic pipe testing machine made in accordance with the teachings of the present invention;

Figure 2 is a side elevation of the showing of Figure 1;

Figure 3 is an enlarged fragmentary detail partly in section; and,

Figure 4 is a diagram illustrating the manner in which the machine is intended to operate.

Referring more particularly to the drawings, the numeral 2 generally designates a hydraulic pipe testing machine positioned on standards 3. A pair of side frame members 4 extend throughout the length thereof providing a track-way 5 for the wheels 6 of a motor driven carriage 7 having a sealing-head 8. Pivotally mounted on a longitudinally extending top frame member 9 are vertically depending arms 10 which are operated by an air cylinder 11 through a connecting-rod 12. Oppositely disposed with respect to the motor driven carriage 7, and rigidly mounted on the side frame members 4, is the multiple pressure cylinder test-head 15 of my invention. Thus, it will be seen that a pipe 16 placed on suitable rollers 17 can be pushed in position against the sealing member 18 of the test-head 15 by the motor driven carriage 7 (the latter being locked in position by any suitable means, not shown) and is prevented from bowing upwardly by the vertically depending arms 10 operated by the air cylinder 11.

The multiple pressure cylinder test-head 15, which is rigidly mounted on the rearward end of the testing machine frame members 4, comprises a forward cylinder-block 24 and a rearward cylinder-block 25 rigidly connected by stay-bolts 26. The rearward cylinder-block 25 has a cylinder 28 therein which opens on the forward side thereof, together with cylinders 29 and 30 which are disposed on opposite sides of the cylinder 28 and open on the rearward side of the rearward cylinder-block 25. A main piston 31 in the cylinder 28 extends forwardly through the cylinder-block 24. Pistons 29ª and 30ª are disposed in cylinders 29 and 30 respectively, and are directly connected to a cross-head 32. The main piston 31 is connected to the cross-head 32 by a piston-rod 33 extending through an opening 34 in the rearward wall of the rearward cylinder-block 25. Fluid under pressure may be admitted to cylinders 28, 29 and 30 through openings 36, 37 and 38, respectively, in the rearward cylinder-block 25.

The forward cylinder-block 24 has a centrally disposed opening 40 in its rearward wall through which the main piston 31 extends into a central forwardly opening cylinder 41 having a larger diameter than the opening 40. The main piston 31 carries on its forward end a cross-head 42 having a bore 43 which extends through the cross-head 42 rearwardly to a point adjacent the end of the cylinder 41. Tangential ports 44 connect the bore 43 in the cross-head 42 with a source of fluid under pressure through an opening 45 in the forward cylinder-block 24. Three pairs of cylinders 46—47, 48—49 and 50—51 are provided in the forward cylinder-block 24 on opposite sides of the central forwardly opening cylinder 41 having pistons 46ª—47ª, 48ª—49ª and 50ª—51ª, respectively, positioned therein and connected to the cross-head 42. The cylinders 41, 46, 47, 48, 49, 50 and 51 are connected to a common source of fluid under pressure through openings 52 in the rearward wall of the forward cylinder-block 24.

Referring to Figure 4. A source of constant hydraulic pressure 53, supplies the fluid necessary for operation of the machine. Pipe 54 connects the constant pressure to cylinder 28 through opening 36 at all times, tending to force sealing member 18 against pipe 16 and providing the sealing pressure. Valve 55 and piping 56 provide a connection to the two cylinders 29 and 30 through openings 37 and 38, so that the two cylinders operate jointly and pressure may be applied when desired.

The area of the two cylinders is approximately twice the area of cylinder 28, and when equal pressure is applied to cylinders 28, 29, and 30, the entire piston assembly is retracted, cylinders 29 and 30 overbalancing cylinder 28. All ten pistons are rigidly interconnected through crossheads 32 and 42 and rods 31 and 33, and in the normal idle position, the entire assembly is retracted.

When the tube to be tested is in position, valve 55 is manipulated to relieve the pressure on cylinders 29 and 30, and the assembly is moved forward by the pressure on cylinder 28, bringing sealing member 18 into contact with the tube to be tested with a force equal to that exerted by cylinder 28. With the sealing member 18 in contact with the tube to be tested, valve 57 is opened, and fluid is admitted through non-return valve 58, piping 59, and opening 45, into cylinder 41.

The fluid passes through ports 44, the bore 43 of the rod 31, the central opening in sealing member 18 and into the tube to be tested. Cylinder 41 is of such size that its effective area equals the areas of the smaller tube to be tested. As the fluid entering through this cylinder increases the pressure in the tube, producing a force tending to move the sealing member 18 away from the tube, the same pressure exerted on the equal area of cylinder 41 exactly opposes this force, and sealing member 18 remains in contact with the tube, effecting a seal.

If the tube under test is larger than the minimum size of the machine, the pressure may be introduced into the pairs of cylinders 46—47, 48—49, 50—51, singly or in groups, so that the area of the tube being tested is approximated by the area of the pistons under pressure. The cylinders are connected in pairs and to the valves 61, 62 and 63 by pipes 67, 68 and 69. Header pipe 60 conveys the fluid pressure from pipe 59 to valves 61, 62 and 63. Valves 64, 65 and 66 are relief valves, to provide vents for each pair of cylinders.

If the desired test pressure is greater than the pressure available in hydraulic main 53, the desired pressure may be obtained by a method such as the intensifier shown. By opening valve 70, pressure is applied to cylinder 71 and piston 74. The force applied to piston 74 is transmitted to smaller piston 73, which in turn exerts a pressure on the fluid in cylinder 72, greater than the pressure exerted by the fluid in cylinder 71. Non-return valve 58 restricts this pressure to the various cylinders in cylinder-block 24 and the tube under test.

The machine is operated in the following manner: Assume that 2½" tubing is to be tested and reference to the design data indicates that cylinders 41, 50 and 51 together equal the area of this size tube. Valve 61 is opened and 62 and 63 are closed to connect only cylinders 50 and 51 to cylinder 41. Valve 64 must be closed to avoid loss of pressure and 65 and 66 must be opened to avoid build-up of pressure in the other cylinders. Valve 55 is opened, applying pressure to cylinders 29 and 30 and retracting the piston assembly and sealing member 18.

The tube to be tested is placed in position, and sealing-head 8 on carriage 7 is brought into position to close the far end of the tube in the usual manner. Valve 55 is then closed and the pressure applied to cylinder 28 moves the piston assembly and sealing member 18 into contact with the pipe to be tested, effecting a seal. Valve 57 is opened and fluid flows into the pipe, filling it and building up additional force in cylinders 41, 50 and 51 to oppose the force of the fluid in the pipe against sealing member 18. If insufficient pressure is available from line 53 to test at the desired pressure, valve 70 may be opened, automatically closing non-return valve 58 against the fluid feeding through the valve 57 from the hydraulic main 53, and applying the higher pressure to the tube and to cylinders 41, 50 and 51. At the completion of the test period, valves 57 and 70 are closed, removing the pressure from the tube and valve 55 is then opened, retracting the sealing-head assembly. Since the required pistons in the forward cylinder-block 24 are connected to a common source of supply the pressure on the sealing member 18 is equal to the pressure in the pipe, and consequently these pressures offset each other so that the only pressure on the end of the pipe will be the sealing pressure exerted by the cylinder 28 in the rearward cylinder-block 25. Therefore there is no tendency to upset the ends of the pipe or distort the threads when subjecting pipe to internal pressure according to my invention.

While I have shown and described one specific embodiment of my invention, it will be understood that I do not wish to be limited exactly thereto since various modifications may be made within the scope of my invention, as defined by the following claims.

I claim:

1. Apparatus for testing leakage of a hollow object, including clamping means for holding and sealing said object including a test-head, said test-head comprising a sealing member for engagement around an opening of said object, a plurality of independent hydraulic units connected with said sealing member for urging the same into engagement with said object, means for introducing a predetermined substantially constant pressure into one of the hydraulic units for imposing a clamping thrust upon the sealing member, and means for supplying fluid under pressure into said object under test, said last-named means including means for imposing an additional clamping thrust upon said sealing member at all times substantially equal to the reactive thrust upon said sealing member due to pressure variations within said object.

2. In a hydraulic testing machine of the type described, means for exerting a preliminary sealing pressure around an opening in the test object, said means comprising a test-head including a relatively movable plunger and cylinder structure, a sealing member carried by the movable element of said structure, means for urging said sealing member into position around an opening in the test object, means for supplying test fluid under pressure to the test object, and means for supplementing the movable element of said structure with an additional pressure which substantially counterbalances the pressure of the test fluid.

3. In a hydraulic testing machine of the type described, means for exerting a preliminary sealing pressure around an opening in the test object, said means comprising a test-head including a relatively movable plunger and cylinder structure, a sealing member carried by the movable element of said structure, means for urging said sealing member into position around an opening in the test object, means for supplying test fluid under pressure to the test object, means for supplementing the movable element of said structure with an additional pressure which substantially counterbalances the pressure of the test fluid, and selective means in addition to said last-named means for coaction with said sealing member according to the size of the test object for maintaining a counterbalancing pressure upon said sealing member which is substantially equal to any test pressure supplied to said object.

4. In a hydraulic testing machine of the type described, means for exerting a preliminary sealing pressure around an opening in the test object, said means comprising a test-head including a relatively movable plunger and cylinder structure, a sealing member carried by the movable element of said structure, means for urging said sealing member into position around an opening in the test object, means for supplying test fluid under pressure to said object through said sealing member, and means for supplementing the movable element of said structure with an additional pressure which substantially counterbalances the reactive thrust upon said sealing member due to the pressure of the test fluid.

5. In a hydraulic testing machine of the type described, means for exerting a preliminary sealing pressure around an opening in the test object, said means comprising a test-head including a relatively movable plunger and cylinder structure, a sealing member carried by the movable element of said structure, means for urging said sealing member under predetermined thrust into position around an opening in the test object, means for supplying test fluid under pressure to said object through said sealing member, means for supplementing the movable element of said structure with an additional pressure which substantially counterbalances the pressure of the test fluid, and selective means in addition to said last-named means for coaction with said sealing member according to the size opening of the test object for maintaining a counterbalancing pressure upon said sealing member for different sizes of objects and which is substantially equal to any test pressure supplied to said object.

6. In a hydraulic testing machine of the type described, comprising a test-head including a relatively movable plunger and cylinder structure, a sealing member carried by the movable element of said structure to exert a sealing pressure around an opening in the object to be tested, means for supplying test fluid under pressure to said object and to said plunger and cylinder structure, and selective means in addition to said plunger and cylinder structure for coaction with said sealing member according to the size opening of said object for maintaining a counterbalancing pressure upon said sealing member which is substantially equal to any test pressure supplied to said object.

7. In a hydraulic testing machine of the type described, comprising a test-head including a relatively movable plunger and cylinder structure, a sealing member carried by the movable element of said structure to exert a sealing pressure around an opening in the object to be tested, means for supplying test fluid under pressure to said object through said sealing member and to said plunger and cylinder structure, and selective means in addition to said plunger and cylinder structure for coaction with said sealing member according to the size opening of said object for maintaining a counterbalancing pressure upon said sealing member which is substantially equal to any test pressure admitted to the interior of said object.

8. In a hydraulic testing machine of the type described, a test-head comprising connected forward and rearward cylinder-blocks, said blocks having axially aligned cylinders, a piston in each of said cylinders, said pistons extending from their respective cylinder-blocks and being connected together, a sealing member connected to the forward end of the piston in the cylinder in the forward cylinder-block, means for supplying fluid under pressure to the rear of the piston in the cylinder of the rearward cylinder-block to exert a preliminary sealing pressure on said sealing member, means for supplying a fluid under pressure through the piston in the cylinder of the forward cylinder-block and through said sealing member, and means for supplying to the rear of the piston in the cylinder of the forward cylinder-block a fluid under substantially the same pressure as that supplied therethrough, whereby the pressure of the test fluid is substantially counterbalanced at said sealing member and the effective sealing pressure maintained substantially constant.

9. In a hydraulic testing machine of the type described, a test-head comprising connected forward and rearward cylinder-blocks, said blocks having axially aligned cylinders, a piston in each of said cylinders, said pistons extending from their respective cylinder-blocks and being connected together, a sealing member connected to the forward end of the piston in the cylinder in the forward cylinder-block, means for supplying fluid under pressure to the rear of the piston in the cylinder of the rearward cylinder-block to exert a preliminary sealing pressure on said sealing member, means for supplying a fluid under pressure through the piston in the cylinder of the forward cylinder-block and through said sealing member, means for supplying to the rear of the piston in the cylinder of the forward cylinder-block a fluid under substantially the same pressure as that supplied therethrough, whereby the pressure of the test fluid is substantially counterbalanced at said sealing member and the effective sealing pressure maintained substantially constant.

HUGH K. HYBARGER.